United States Patent
Malone et al.

[11] Patent Number: 5,839,512
[45] Date of Patent: Nov. 24, 1998

[54] ADJUSTABLE CASING HANGER WITH CONTRACTIBLE LOAD SHOULDER AND METAL SEALING RATCH LATCH ADJUSTMENT SUB

[75] Inventors: Steven Robert Malone, East Kilbride; Gavin Thomas Reilly, Lanarkshire; Sean McAvoy, Coatbridge, all of Scotland

[73] Assignee: FMC Corporation, Chicago, Ill.

[21] Appl. No.: 761,457

[22] Filed: Dec. 6, 1996

[30] Foreign Application Priority Data

Dec. 14, 1995 [GB] United Kingdom .................... 9525512

[51] Int. Cl.⁶ .................................................. E21B 33/043
[52] U.S. Cl. ...................... 166/348; 166/208; 166/242.7; 166/382
[58] Field of Search ..................................... 166/348, 382, 166/208, 242.7; 285/123.4, 123.14

[56] References Cited

U.S. PATENT DOCUMENTS

| | | | |
|---|---|---|---|
| 3,721,292 | 3/1973 | Ahlstone ................................. | 166/208 |
| 4,995,464 | 2/1991 | Watkins et al. .......................... | 166/382 |
| 5,002,131 | 3/1991 | Cromar et al. .......................... | 166/382 |
| 5,082,060 | 1/1992 | Johnson et al. ......................... | 166/339 |
| 5,176,218 | 1/1993 | Singer et al. ............................ | 166/206 |
| 5,226,493 | 7/1993 | Watkins et al. .......................... | 166/237 |
| 5,255,746 | 10/1993 | Bridges ................................... | 166/348 |
| 5,259,459 | 11/1993 | Valka ...................................... | 166/345 |
| 5,311,947 | 5/1994 | Kent et al. .............................. | 166/348 |
| 5,439,061 | 8/1995 | Brammer et al. ....................... | 166/368 |
| 5,450,904 | 9/1995 | Galle ...................................... | 166/348 |
| 5,638,903 | 6/1997 | Kent ....................................... | 166/348 |
| 5,653,289 | 8/1997 | Hosie et al. ............................. | 166/348 |
| 5,671,812 | 9/1997 | Bridges ................................... | 166/348 |

OTHER PUBLICATIONS

Brochure: Adjustable Sub; Dril–Quip Inc., Houston, TX; 4 pages.

*Primary Examiner*—Hoang C. Dang
*Attorney, Agent, or Firm*—Henry C. Query, Jr.

[57] ABSTRACT

An adjustable casing hanger comprising a first tubular component having an end connection attachable to the upper end of a casing string in use; a second tubular component securable to the first component, the relative axial position in which the first component is secured to the second component being adjustable to vary the vertical position at which the casing string is supported; and a load shoulder radically movable between an expanded position in which in use it supports the second component on a co-operating landing surface and a contracted position in which it allows passage of the shoulder past the landing surface.

12 Claims, 3 Drawing Sheets

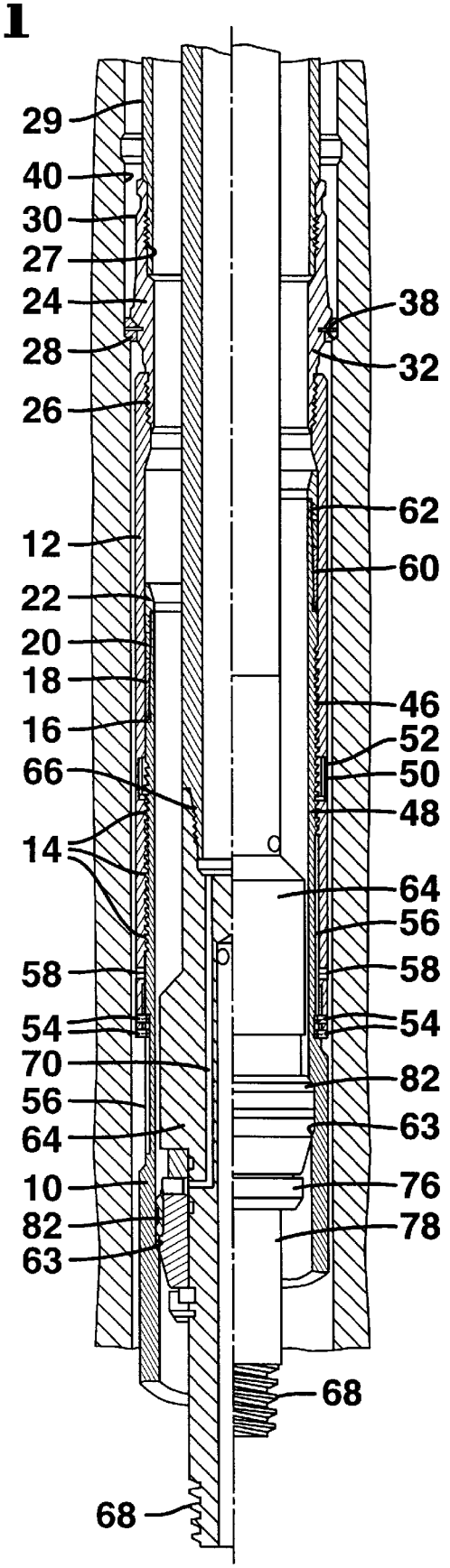
FIG_1

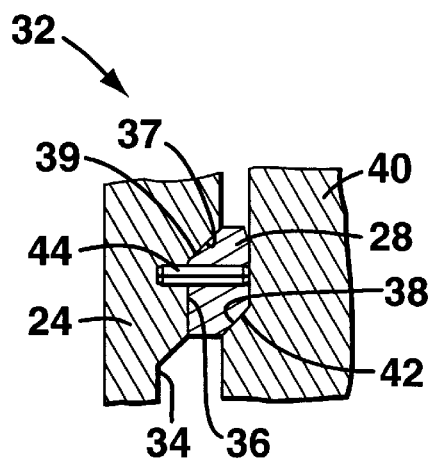
FIG_2
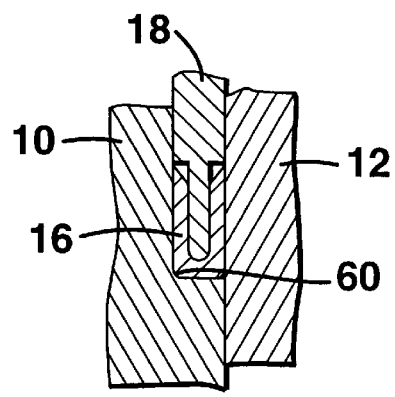
FIG_3
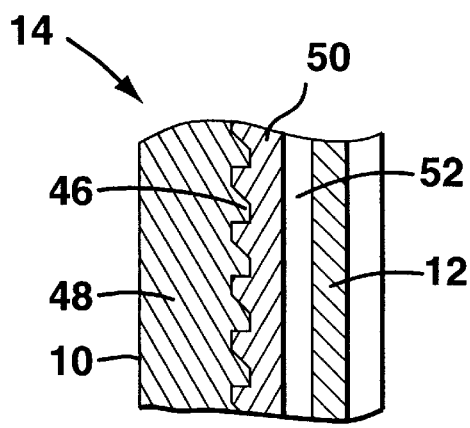
FIG_4
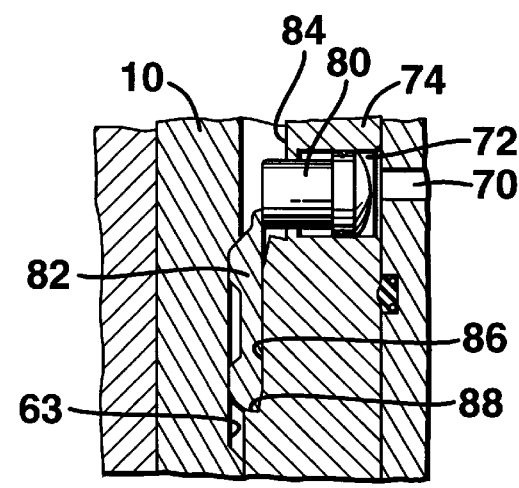
FIG_5
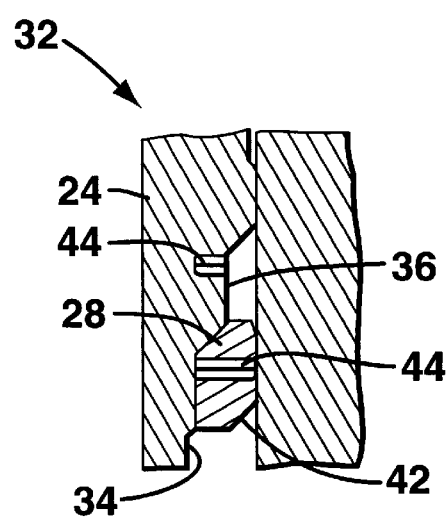
FIG_7

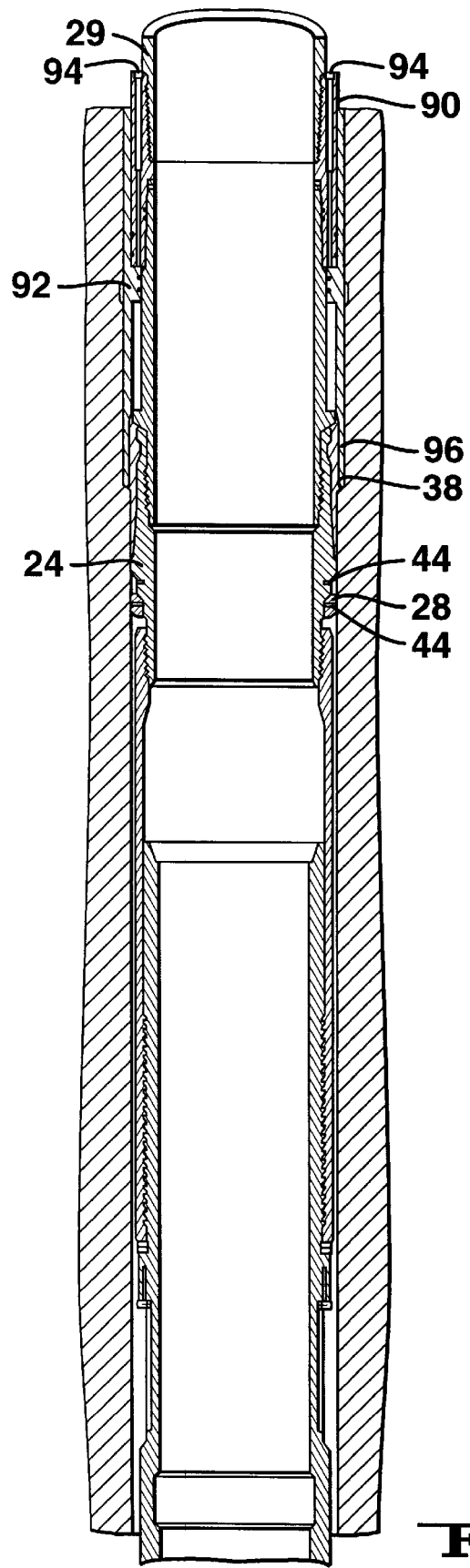
FIG_6

ADJUSTABLE CASING HANGER WITH CONTRACTIBLE LOAD SHOULDER AND METAL SEALING RATCH LATCH ADJUSTMENT SUB

This invention relates to an adjustable casing hanger for use in offshore oil and gas production. There is sometimes a need to make up a removable flow connection between a platform or other wellhead system component and a subsea wellhead or mudline casing suspension system. The following description refers in particular to the connection of a platform wellhead to a mudline suspension system, but the invention is of wider applicability and may be used for example to connect a subsea wellhead to a mudline suspension system, or a platform mounted wellhead component to a subsea wellhead component.

The flow connection is made using a pre-tensioned tieback casing string. As neither the spacing between the mudline suspension system and the platform wellhead nor the length of the assembled tieback casing is known with great accuracy, there is a requirement for axial length adjustment in the flow connection. Further axial adjustment also permits application and release of tieback string pre-tensioning strain. Adjustable casing hanger systems are known for these purposes, but suffer from various drawbacks.

Firstly, in known adjustable casing hanger designs, the axial adjustment to give the pre-tensioning strain must be added to the axial adjustment required to accommodate any mismatch between the relaxed length of the casing string and the distance between the connection points at the subsea hanger system and platform wellhead. These cumulative adjustments mean that the total axial movement at the hanger during installation can be considerable.

Further, to release the tieback string it is necessary to relieve the tensile load on the axial adjustment mechanism by pulling upwardly on the tieback string from below the adjustable hanger, then to lengthen the adjustment mechanism, then to break out the lower tieback string to mudline suspension system connection and finally pull the tieback string. This sequence of operations is time-consuming and requires complex and expensive running tools.

In a first aspect, the invention provides an adjustable casing hanger which these disadvantages are mitigated or eliminated, the hanger comprising a first tubular component having an end connection attachable to the upper end of a casing string in use; a second tubular component securable to the first component, the relative axial position in which the first component is secured to the second component being adjustable to vary the vertical position at which the casing string is supported; and a load shoulder radially movable between an expanded position in which in use it supports the second component on a co-operating landing surface and a contracted position in which it allows passage of the shoulder past the landing surface.

When it is desired to pull a tieback casing string attached to such a hanger, it is not necessary to disturb the adjustment of the first component relative to the second. Instead the load shoulder can be contracted for passage past the landing surface, considerably simplifying the retrieval procedure and retrieval tool required.

Furthermore, such a hanger can, in some forms, accommodate greater mismatches between the tieback string length and the spacing of its connection points than prior adjustable hangers as, if necessary, the load shoulder can be contracted and run past the landing surface for connection of the tieback string lower end and the mudline hanger system, the tieback tensioning pull then being used to bring the load shoulder above the landing surface again, the load shoulder then being expanded and landed on the landing surface by axial adjustment of the first and second components. Once adjusted, the first and second components can be locked together to maintain the desired tieback pre-tension. Thus, the hanger adjustments necessary on the one hand to accommodate casing string length/connection point spacing mismatches and on the other hand pre-tensioning strain are not cumulative.

A second drawback of many prior adjustable casing hangers is that they make a seal with their surrounding housing at a location above the landing surface which varies depending upon their state of adjustment. This leads to large, exposed sealing surfaces which are difficult to machine and prone to damage. These problems are overcome in some prior designs which include a first tubular hanger component threadingly received within a second tubular hanger component to provide axial adjustability, the first component having a lower end connection for the tieback string, the second component having a support shoulder for co-operation with a hanger landing surface, a seal being provided between the second component and a surrounding housing at a fixed location, and a farther seal being provided between the first and second components. However, as there is both relative rotation and axial displacement between the first and second components, only elastomeric seals can be used between them, limiting the temperatures, pressures and chemical environments which the hanger can withstand.

In a second aspect, the invention provides an adjustable metal-to-metal sealing casing hanger comprising a first tubular component having an end connection attachable to a casing string, a second tubular component securable to the first by a mechanism permitting adjustment of the relative axial positions of the first and second components, a load shoulder arranged in use to support the second component on a co-operating landing surface in a surrounding housing and a sealing surface for the second component for forming a seal with the housing, wherein the adjustment mechanism comprises a ratchet latch mechanism and a metal-to-metal seal is provided between the first and second components.

The seal between the second component and the surrounding housing may be made at a fixed location, eliminating the need for large seal surfaces. The second component may be axially adjusted relative to the first without rotation, allowing the use of a metal-to-metal seal between the first and second components. As adjustment of the hanger involves purely axial movement without the need for rotation, the hanger running tool and installation/retrieval procedures are simplified.

Further preferred features are in the dependent claims. An illustrative embodiment of the invention is described below with reference to the drawings in which:

FIG. 1 is a longitudinal half-section of an adjustable casing hanger and tensioning tool, showing a contractible load shoulder expanded for reception on a wellhead landing surface, the left-hand half of the figure showing the hanger in a relaxed state and the right hand half of the figure showing the hanger adjusted to pre-tension a tieback casing string;

FIG. 2 is a section corresponding to FIG. 1 showing the expanded load shoulder in more detail;

FIG. 3 is a section corresponding to FIG. 1 showing the metal-to-metal seal element in more detail;

FIG. 4 is a section corresponding to FIG. 1 showing the ratchet latch mechanism in more detail;

FIG. 5 is a section corresponding to FIG. 1 showing details of the tensioning tool's latch mechanism;

FIG. 6 is a longitudinal section showing a load shoulder release tool and the hanger with the load shoulder contracted and lowered past the wellhead landing surface; and FIG. 7 is a section corresponding to FIG. 6 showing the contracted load shoulder in more detail.

Referring to FIG. 1, the adjustable casing hanger comprises a first component 10 having a lower connection (e.g. a metal sealing premium thread, not shown) for connection to a tieback casing string (not shown). First component 10 is adjustably connected to a part 12 of a second component by a ratchet latch mechanism 14. Together the component 10 and part 12 comprise an adjustment sub having a metal-to-metal dynamic seal element 16, a bearing ring 18, a resilient seal spacer ring 20 and a backup nut 22 (FIGS. 1 and 3).

The second component further comprises a solid body mandrel 24 connected to the part 12 by metal sealing premium threads 26 and having an internal seal profile and left-hand ACME thread 27 for sealed connection to a landing string 29. Mandrel 24 carries a contractible load shoulder in the form of a split ring 28 which in the preferred embodiment is spring biased towards the radially inner, contracted condition. Other embodiments are possible, in which the load shoulder ring 28 is biased outwardly, permitting use of an alternative installation procedure, advantageous in certain circumstances described below.

Externally the mandrel 24 has a metal seal packoff profile 30 at its upper end and a mid-portion 32 providing twin steps 34, 36 on which the load shoulder ring 28 is carried, as best seen in FIGS. 2 and 7. The upper step 36 has a larger diameter than the lower step 34 and supports the load shoulder ring 28 in its expanded condition (FIG. 2), whereas the lower step supports the ring 28 in its contracted condition (FIG. 7). Hang loads are transmitted from the mandrel 24 to the ring 28 by a 45 degree load surface 37 of upper step 36 which co-operates with a correspondingly inclined upper load surface 39 on ring 28. When expanded, a 45 degree landing shoulder 42 of the ring 28 comes to rest on a landing surface 38 provided in a surrounding wellhead housing 40. The ring 28 is fixed in its expanded condition to the mandrel 24 by shear pins 44 during installation of the hanger. With the ring 28 contracted so as to reside in step 34 (FIG. 7) the landing shoulder can move past the wellhead landing surface 38, allowing fall passage of the hanger through the wellhead.

The adjustment sub formed by the component 10 and part 12 includes a ratchet latch mechanism comprising external grooves 46 on an upper section 48 of component 10 which is telescopingly received within part 12. The grooves 46 may be, for example, a modified buttress thread form, having a downwardly directed square face and a sloping upper face. A split ratchet ring 50 housed in an internal recess 52 is spring biased into engagement with the grooves 46. The profile of the grooves 46 and of corresponding teeth on the ratchet ring 50 is such that an upward pull on component 10 will cam the ring 50 outwardly, allowing component 10 to ratchet upwardly relative to part 12, the ring 50 latching into the grooves 46 to lock component 10 against downward movement.

Anti-rotation keys 54 protrude inwardly from the lower end of part 12 to be received in longitudinal grooves 56 in the exterior of the component 10 upper section 48. As shown on the left-hand side of FIG. 1 the component 10 and part 12 are held together by shear pins 58, which are broken to permit adjustment of the ratchet latch mechanism as shown on the right-hand side of FIG. 1.

The extreme upper end of the upper section 48 of component 10 has an external recess which accommodates the seal element 16, bearing ring 18 and resilient seal spacer 20, and is threaded at 62 to receive the backup nut 22.

The component 10 has an internal latch profile 63 which is engaged by a pre-tension tool 64 during hanger installation/retrieval. The pre-tension tool 64 is used to apply tension to the tieback string after its lower end has been connected to the mudline suspension system. The tool 64 is therefore run above a subsea tieback tool (not shown) and has the facility to drift through the adjustable casing hanger during the make-up sequence of the tieback string/mudline suspension system connection. The pre-tension tool 64 is of solid body construction and is run using top and bottom drill pipe connections 66, 68 respectively. As shown in FIGS. 1 and 5 it comprises hydraulic passageways 70 terminating in circumferentially spaced cavities 72 formed in a ring support body 74 held captive on the lower end of the body 78 of the pre-tension tool by a nut 76. The cavities 72 house pistons 80 whose outer ends act on an inwardly biassed split ring 82 to eject it from a circumferential recess 84 in the ring support body 74 and into engagement with the latch profile 63. An upward pull on the tool 64 then causes a backup surface 86 of the ring support body 74 to move behind the ring 82 whose lower edge comes to rest against an upwardly facing shoulder 88 on the support body 74. In this way the tool 64 is locked to the first hanger component 10 for application of upward force, even after release of hydraulic pressure from the cavities 72.

Referring to FIG. 6, there is shown a load shoulder release tool 90 fitted between the end of the landing string 29 and the mandrel 24 of the hanger second component. The release tool 90 includes an outer annular piston 92 actuated by hydraulic pressure applied to conduits 94. The piston 92 comprises a depending skirt 96 engageable behind the outer rim of the load shoulder ring 28 to lift the mandrel 24 and running string 29 relative to the load shoulder ring 28, shearing the pins 44 and simultaneously levering the load ring downwardly past the landing surface 38, out of the step 36 to contract into the step 34.

Hanger Installation Procedure

The following procedure applies in the usual case where the tieback casing string and unadjusted hanger are of sufficient length to ensure that the hanger load shoulder remains above the wellhead landing surface 38 during make up of the subsea connection.

1) Run tieback casing string, suspend in rig floor slips and make up last joint to adjustable casing hanger.

2) Make up landing string 29 to hanger.

3) Remove slips, run hanger in hole, and stab tieback casing string lower end into mudline suspension system connection. Pull back a short distance and suspend landing string 29 in rig floor slips.

4) Make up subsea tieback tool to drill string, run in hole to required depth and suspend in split slips at the rig floor. Make up pre-tension tool 64 to top of drill string, remove split slips and run drill string in hole.

5) Engage subsea tieback tool in mudline suspension system landing profile. Take tieback string weight on drill pipe. Remove rig floor casing slips, lower tieback string onto mudline suspension system and make-up subsea connection.

6) Disengage subsea tieback tool and apply overpull to drill string.

7) As the drill string is rising, apply a nominal pressure through the drill pipe to hydraulically expand the split ring 82 of pre-tension tool 64 and latch it into profile 63 of the hanger first component 10.

8) Continue overpull to mechanically lock the pre-tension tool 64 to the hanger first component 10 and apply required pre-tension to tieback casing string.

9) Apply axial load to the top of the hanger mandrel 24 (via jacks or annulus pressure) to shear pins 58 and allow the mandrel 24 and landing string 29 to ratchet down until the load shoulder ring 28 lands on the wellhead landing surface 38.

10) Release drill string overpull to transfer tieback casing pre-tension to wellhead landing surface 38.

11) Release drill string pressure, lower drill string to disengage split ring 82 from hanger profile 63.

12) Retrieve drill string and landing string 29.

Hanger Retrieval Procedure a) Make up load shoulder release tool 90 to running string 29, run in hole and attach to mandrel 24 of adjustable hanger.

b) Make up subsea tieback tool to drill string, run in hole to required depth and suspend in split slips at the rig floor. Make up pre-tension tool 64 to top of drill string, remove split slips and run drill string in hole.

c) Apply a nominal pressure through the drill pipe to hydraulically expand the split ring 82 of pre-tension tool 64 and latch it into profile 63 of the hanger first component 10.

d) Apply overpull to mechanically lock the pre-tension tool 64 to the hanger first component 10 and lift the load shoulder ring 28 a short distance clear of the wellhead landing surface 38.

e) Activate hydraulic piston 92 on the shoulder release tool 90 to contract the load shoulder ring 28 by shearing pins 44 and forcing the ring 28 into the lower step 34.

f) Slack off tieback string pre-tension by lowering drill string.

g) Release drill string pressure, lower drill string to disengage split ring 82 from hanger profile 63.

h) Engage subsea tieback tool in mudline suspension system landing profile. Take tieback string weight on drill pipe. Break-out subsea connection.

i) Pick up tieback casing string and suspend in slips at rig floor. Disengage subsea tieback tool.

j) Retrieve drill string, load shoulder release tool 90 and running string 29.

Modified Hanger Installation Procedure

Where the tieback casing string and unadjusted (i.e. set to maximum length) hanger are "too short" by less than the required pre-tensioning strain, an alternative installation procedure is possible, in which steps 2), 3), 8), 9) and 12) above are replaced as below. To enable use of this procedure, the load shoulder ring 28 must be capable of being biassed outwardly from the lower step 34 onto the upper step 36, rather than being inwardly biassed as is preferred in the installation procedure described above.

2') Make up load shoulder release tool 90 to hanger and running string 29 to release tool 90.

3') Remove slips, run hanger in hole to land load shoulder 28 on wellhead landing surface 38. Back out a short distance and suspend running string in slips at rig floor. Activate hydraulic piston 92 on the shoulder release tool 90 to contract the load shoulder ring 28 by shearing pins 44 and forcing the ring 28 into the lower step 34. Remove slips, and stab tieback casing string lower end into mudline suspension system connection, with load shoulder ring 28 moving past landing surface 38. Pull tieback casing back a short distance and suspend landing string 29 in rig floor slips.

8') Continue overpull to mechanically lock the pre-tension tool 64 to the hanger first component 10, raising piston 92, bringing the load shoulder ring level with the landing surface 38 and allowing it to expand and seat on that surface. Continue overpull to apply required pre-tension to tieback casing string.

9') Apply axial load to the top of the hanger mandrel 24 to shear pins 58 and allow the mandrel 24 and landing string 29 to ratchet down into contact with the load shoulder ring 28.

12') Retrieve drill string, load shoulder release tool 90 and running string 29.

We claim:

1. An adjustable casing hanger comprising a first tubular component having an end connection attachable to the upper end of a casing string in use;

a second tubular component securable to the first component, the relative axial position in which the first component is secured to the second component being adjustable to vary the vertical position at which the casing string is supported; and a load shoulder radially movable between an expanded position in which in use it supports the second component on a co-operating landing surface and a contracted position in which it allows passage of the shoulder both up and down past the landing surface.

2. A casing hanger as defined in claim 1 wherein the load shoulder comprises a contractible split ring.

3. A casing hanger as defined in claim 2 wherein the second tubular component comprises an upper peripheral step in which the split ring resides in its expanded condition and a lower peripheral step in which the split ring resides in its contracted condition.

4. A casing hanger as defined in claim 3 wherein the upper step includes a load surface inclined at substantially 45 degrees to the axis of the second tubular component for co-operation with a correspondingly inclined upper load surface on the split ring in the transmission of hang loads from the second tubular component to the split ring.

5. A casing hanger as defined in claim 1 wherein the load shoulder comprises a landing shoulder inclined at substantially 45 degrees to the axis of the second tubular component.

6. A casing hanger as defined in claim 1 wherein the load shoulder is resiliently biassed towards the contracted position.

7. An adjustable metal-to-metal sealing casing hanger comprising a first tubular component having an end connection attachable to a casing string;

a second tubular component securable to the first by a mechanism permitting adjustment of the relative axial positions of the first and second components;

a load shoulder arranged in use to support the second component on a co-operating landing surface in a surrounding housing, the load shoulder radially movable between an expanded position in which in use it supports the second component on a co-operating landing surface and a contracted position in which it allows passage of the shoulder both up and down past the landing surface; and a sealing surface on the second component for forming a seal with the housing;

wherein the adjustment mechanism comprises a ratchet latch mechanism and a metal-to-metal seal is provided between the first and second components.

8. A casing hanger as defined claim 1 or 7 comprising a longitudinal adjustment mechanism including external grooves on a portion of one of the first or second components which is telescopingly received within the other of the first or second components, and a split ratchet ring housed in a recess in the other of the first and second components and resiliently biassed into engagement with the grooves.

9. A casing hanger as defined in claim 1 or 7 comprising an anti-rotation key protruding from one of the first or second components into a longitudinal groove in the other of the first or second components.

10. A casing hanger as defined in claim 1 or 7 comprising a dynamic metal-to-metal seal operatively arranged between the first and second components.

11. A casing hanger as defined in claim 10 wherein the dynamic seal comprises a metal seal element, a bearing ring and a resilient seal spacer ring received in a recess in one or other of the first or second components.

12. A method of installing a casing string using a casing hanger as claimed in claim 1 comprising the steps of:

attaching the casing string to the first component end connection;

contracting the load shoulder and running the hanger past the landing surface;

attaching a lower end of the casing string to a subsea connection;

applying overpull to the first component to bring the load shoulder above the landing surface and apply pretension to the casing string;

adjusting the second component relative to the first to bring the load shoulder into contact with the landing surface; and relieving the overpull on the second component to transfer the pretension to the load shoulder and landing surface.

\* \* \* \* \*